(12) United States Patent
Zhang

(10) Patent No.: US 12,219,302 B2
(45) Date of Patent: Feb. 4, 2025

(54) CUSTOMER PREMISE EQUIPMENT, CONTROL METHOD THEREFOR, AND COMPUTER-READABLE STORAGE MEDIUM

(71) Applicant: ZTE CORPORATION, Shenzhen (CN)

(72) Inventor: Yongliang Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 273 days.

(21) Appl. No.: 17/997,752

(22) PCT Filed: May 8, 2021

(86) PCT No.: PCT/CN2021/092486
§ 371 (c)(1),
(2) Date: Nov. 2, 2022

(87) PCT Pub. No.: WO2021/244221
PCT Pub. Date: Dec. 9, 2021

(65) Prior Publication Data
US 2023/0224611 A1    Jul. 13, 2023

(30) Foreign Application Priority Data

Jun. 3, 2020  (CN) .......................... 202010493867.0

(51) Int. Cl.
*H04Q 1/04*    (2006.01)
*H04Q 1/02*    (2006.01)
(Continued)

(52) U.S. Cl.
CPC .............. *H04Q 1/04* (2013.01); *H04W 88/08* (2013.01)

(58) Field of Classification Search
CPC ........... H04Q 1/04; H04Q 1/02; H04W 88/08; H04W 84/12
(Continued)

(56) References Cited

U.S. PATENT DOCUMENTS

| | | | |
|---|---|---|---|
| 2013/0201316 A1* | 8/2013 | Binder | ..................... G07C 3/02 |
| | | | 701/2 |
| 2017/0359106 A1 | 12/2017 | John Wilson et al. | |
| 2020/0119776 A1 | 4/2020 | Lorca Hernando et al. | |

FOREIGN PATENT DOCUMENTS

| | | |
|---|---|---|
| CN | 110784878 A | 2/2020 |
| CN | 110829027 A | 2/2020 |

(Continued)

OTHER PUBLICATIONS

European Patent Office. Extended European Search Report for EP Application No. 21816661.9, mailed Sep. 1, 2023, pp. 1-7.
(Continued)

*Primary Examiner* — Thjuan K Addy
(74) *Attorney, Agent, or Firm* — Vivacqua Crane, PLLC

(57) ABSTRACT

A customer premise equipment (CPE), a control method for the CPE, and a computer-readable storage medium. The CPE may include a WiFi access module (110), a rotating body (120), a base (130), and a control processing module (140), where the rotating body (120) is provided with a millimeter wave access module (121), the base (130) is provided with a rotary driving device (131) and a rotary shaft (132), and the rotary driving device (131) is connected to the rotating body (120) by means of the rotary shaft (132).

19 Claims, 8 Drawing Sheets

(51) Int. Cl.
*H04W 84/12* (2009.01)
*H04W 88/08* (2009.01)

(58) Field of Classification Search
USPC .................. 379/328, 242, 325, 329, 330
See application file for complete search history.

(56) References Cited

FOREIGN PATENT DOCUMENTS

| | | | |
|---|---|---|---|
| CN | 110830062 | A | 2/2020 |
| CN | 110931976 | A | 3/2020 |
| CN | 110931978 | A | 3/2020 |
| CN | 111010203 | A | 4/2020 |
| CN | 111010204 | A | 4/2020 |
| CN | 111082217 | A | 4/2020 |
| CN | 111093118 | A | 5/2020 |
| CN | 111106448 | A | 5/2020 |
| CN | 111313925 | A | 6/2020 |
| CN | 112118495 | A | 12/2020 |

OTHER PUBLICATIONS

Japan Patent Office. Notice of Reasons for Refusal for JP Application No. 2022-567174 and English translation, mailed Dec. 1, 2023, pp. 1-12.
International Searching Authority. International Search Report and Written Opinion for PCT Application No. PCT/CN2021/092486 and English translation, mailed Jul. 26, 2021, pp. 1-11.
The State Intellectual Property Office of People's Republic of China. First Office Action for CN Application No. 202010493867.0 and English translation, mailed Feb. 7, 2021, pp. 1-26.
The State Intellectual Property Office of People's Republic of China. Second Office Action for CN Application No. 202010493867.0 and English translation, mailed Apr. 12, 2021, pp. 1-22.

* cited by examiner

CUSTOMER PREMISE EQUIPMENT, CONTROL METHOD THEREFOR, AND COMPUTER-READABLE STORAGE MEDIUM

CROSS-REFERENCE TO RELATED APPLICATION

This application is a national stage filing under 35 U.S.C. § 371 of international application number PCT/CN2021/092486, filed May 8, 2021, which claims priority to Chinese patent application No. 202010493867.0 filed Jun. 3, 2020. The contents of these applications are incorporated herein by reference in their entirety.

TECHNICAL FIELD

Embodiments of the present disclosure relate to, but are not limited to, the field of communications technologies, and in particular, to a customer premise equipment (CPE), a control method for the CPE, and a computer-readable storage medium.

BACKGROUND

Millimeter wave communication refers to telecommunication using millimeter wave (mmWave) as an information carrier for information transmission. With the advantages of a short wavelength and a large bandwidth, mmWave is an effective solution to many problems faced by high-speed broadband wireless access, and therefore has become one of the key technologies of 5G communication at present.

Customer Premise Equipment (CPE) equipped with a mmWave module that supports 5G signal transmission is commercially available now in order to meet users' requirements for a 5G network coverage. The CPE can convert a 5G signal into a Wi-Fi signal, facilitating users' access to the 5G network. However, featuring a short wavelength, a mmWave signal attenuates quickly and is prone to interference from obstacles. When the CPE suffers interference during signal transmission and the interference cannot be eliminated in a short time, communication quality of the CPE will be degraded, affecting user experience.

SUMMARY

The following is a summary of the subject matters described in detail herein. This summary is not intended to limit the scope of protection of the appended claims.

An embodiment of the present disclosure provides a customer premise equipment (CPE), a control method for the CPE, and a computer-readable storage medium.

In accordance with an aspect, an embodiment of the present disclosure provides a customer premise equipment (CPE), which may include: a Wi-Fi access module; a rotating body, which is provided with a mmWave access module; a base, which is provided with a rotary driving device and a rotary shaft, the rotary driving device being connected to the rotating body via the rotary shaft; a control processing module, which is electrically connected to each of the Wi-Fi access module, the mmWave access module, and the rotary driving device, where the control processing module is configured to obtain transmission quality information of a mmWave signal through the mmWave access module, and control, according to the transmission quality information of the mmWave signal, the rotary driving device to drive the rotating body to move, so as to adjust a position of the mmWave access module.

In accordance with another aspect, an embodiment of the present disclosure provides a control method for a CPE. The CPE may include a Wi-Fi access module, a rotating body, and a base, where the rotating body is provided with a mmWave access module, the base is provided with a rotary driving device and a rotary shaft, and the rotary driving device is connected to the rotating body via the rotary shaft. The control method may include: obtaining transmission quality information of a mmWave signal; and controlling, according to the transmission quality information of the mmWave signal, the rotary driving device to drive the rotating body to move, so as to adjust a position of the mmWave access module.

An embodiment in accordance with yet another aspect of the present disclosure provides a computer-readable storage medium storing computer-executable instructions which are configured for implementation of the control method for a CPE described above.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the appended claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It should be noted that although a division of functional modules is shown in the schematic diagrams of the device and a logical order is shown in the flowcharts, the steps shown or described may be performed, in some cases, in a different division from that of the device or in a different order from that in the flowcharts. The terms "first", "second", etc. in the description, the appended claims and the above-mentioned drawings are intended to distinguish between similar objects and are not necessarily to describe a specific order or sequence.

The present disclosure provides a customer premise equipment (CPE), a control method for the CPE, and a computer-readable storage medium. The CPE includes a Wi-Fi access module, a rotating body, a base, and a control processing module, where the rotating body is provided with a mmWave access module; the base is provided with a rotary driving device and a rotary shaft, the rotary driving device being connected to the rotating body via the rotary shaft; and the control processing module is electrically connected to each of the Wi-Fi access module, the mmWave access module, and the rotary driving device. When a communication link between the CPE and a 5G network is affected by obstruction problems, sudden strong interference, sudden base station failure, or the like, the control processing module can control the rotary driving device to drive the rotating body to move, so as to drive the mmWave access module to move. In this way, a position of the mmWave access module can be adjusted, so that the mmWave access module can overcome obstruction problems, sudden strong interference, sudden base station failure, or the like and keep the communication link between the CPE and the 5G network unblocked, thereby improving the communication quality and user experience.

The embodiments of the present disclosure will be explained below with reference to the accompanying drawings.

Figure 1:
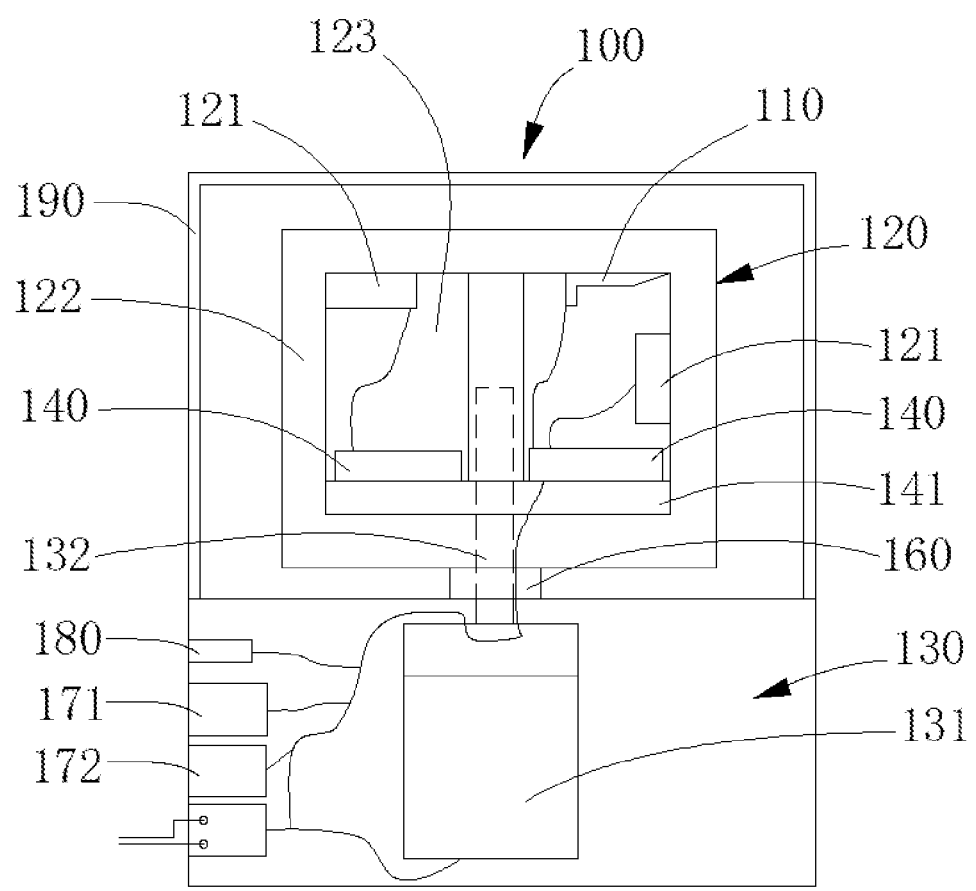
FIG. 1 is a schematic diagram of a customer premise equipment (CPE) provided by an embodiment of the present disclosure.

As shown in FIG. 1, a schematic diagram of a CPE provided by an embodiment of the present disclosure is depicted. In the illustration in FIG. 1, the CPE 100 includes a Wi-Fi access module 110, a rotating body 120, a base 130, and a control processing module 140, where the rotating body 120 is provided with a mmWave access module 121, the base 130 is provided with a rotary driving device 131 and a rotary shaft 132, and the rotary driving device 131 is connected to the rotating body 120 via the rotary shaft 132. The control processing module 140 is electrically connected to each of the Wi-Fi access module 110, the mmWave access module 121, and the rotary driving device 131.

In an embodiment, when a communication link between the mmWave access module 121 and a 5G network is affected by obstruction problems, sudden strong interference, sudden base station failure, or the like, the control processing module 140 can control the rotary driving device 131 to drive the rotating body 120 to move, so as to drive the mmWave access module 121 to rotate. In this way, a position of the mmWave access module 121 can be adjusted, so that the mmWave access module 121 can overcome obstruction problems, sudden strong interference, sudden base station failure, or the like and keep the communication link between the CPE and the 5G network unblocked, thereby improving the communication quality and user experience.

In an embodiment, the rotary driving device 131 is a small-sized motor to meet space requirements of the product. In addition, the rotary driving device 131 can be connected to the rotary shaft 132 via a coupling.

In an embodiment, the rotating body 120 includes a rotating housing 122. The rotating housing 122 defines a first accommodating space 123, in which the mmWave access module 121 is disposed.

Figure 2A:
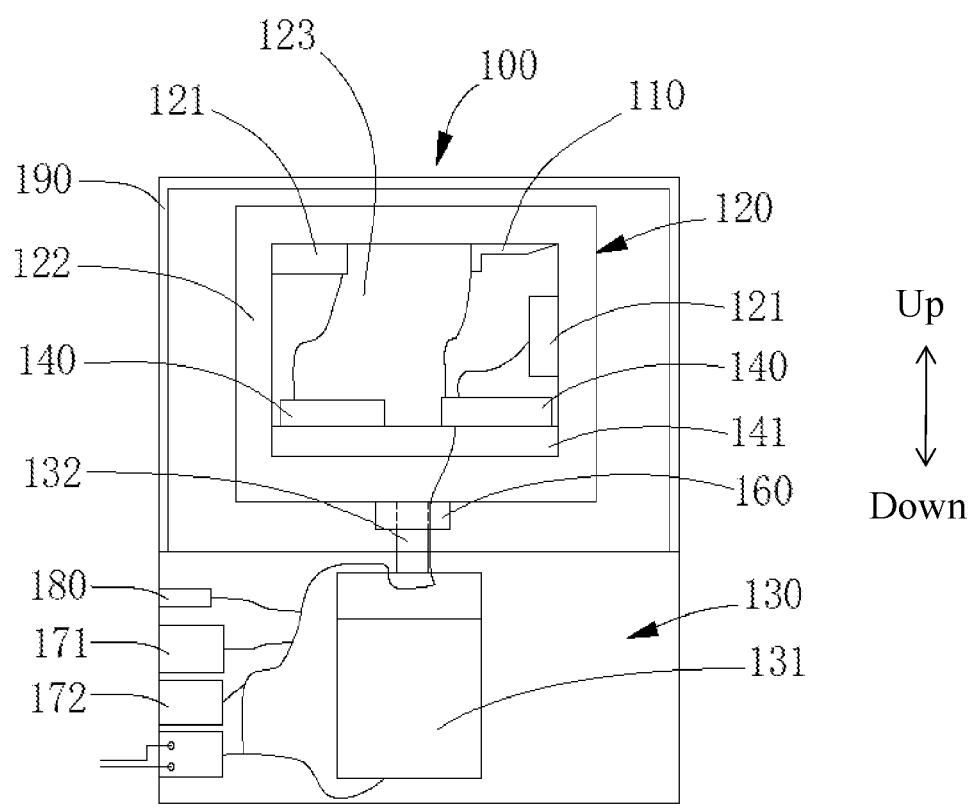
FIG. 2A is a schematic diagram of a CPE provided by an embodiment of the present disclosure.
Figure 2B:
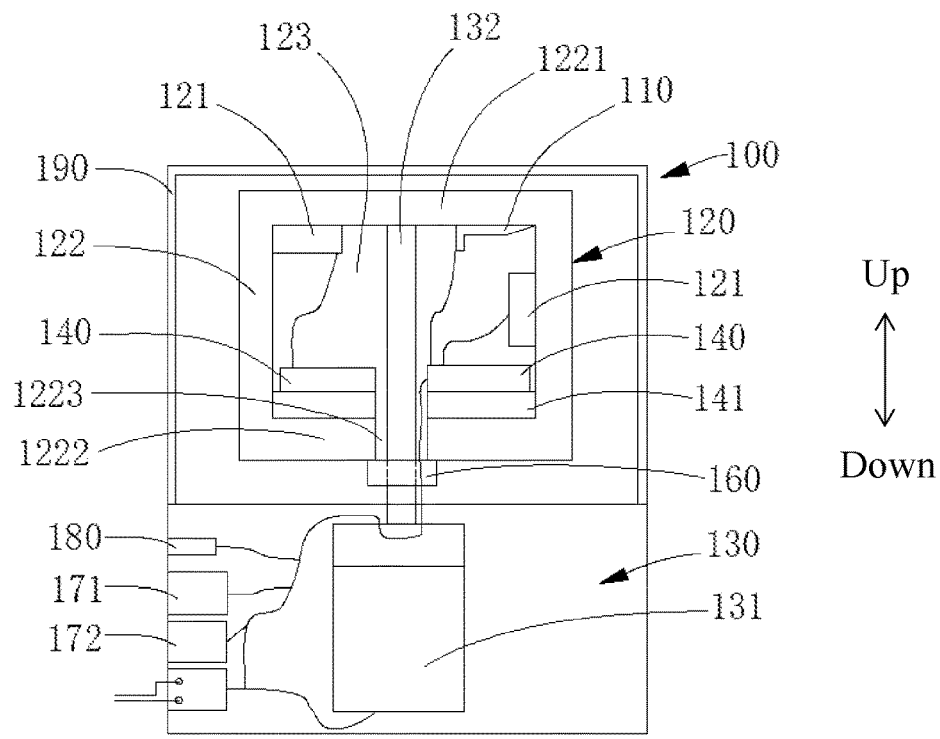
FIG. 2B is a schematic diagram of a CPE provided by an embodiment of the present disclosure.
Figure 2C:
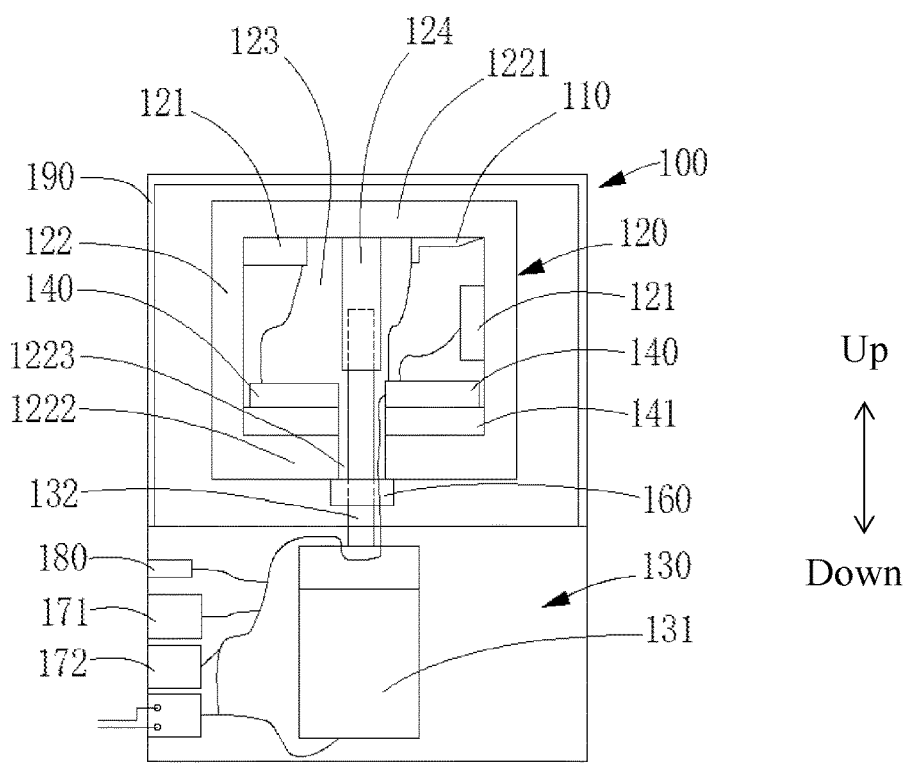
FIG. 2C is a schematic diagram of a CPE provided by an embodiment of the present disclosure.

In an embodiment, the arrangement of the rotating housing 122 and a connection mode between the rotating housing 122 and the rotary shaft 132 have various implementations, which are not specifically limited in this embodiment. For example, as shown in FIG. 2A, the rotating housing 122 may be a fully enclosed housing. In this case, the rotary shaft 132 may be connected to the bottom of the rotating housing 122. In another example, as shown in FIG. 2B, the rotating housing 122 may alternatively be a semi-enclosed housing. In this case, the rotating housing 122 may include a top 1221 and a bottom 1222, where the bottom 1222 is provided with a through hole 1223 through which the rotary shaft 132 may extend to the inside of the first accommodating space 123 and be connected to an inner surface of the top 1221. In addition, in order to facilitate the connection between the rotary shaft 132 and the rotating housing 122, as shown in FIG. 2C, a rotary shaft sleeve 124 is provided inside the rotating housing 122. The rotary shaft sleeve 124 is provided extending from the inner surface of the top 1221 of the rotating housing 122 toward the bottom 1222 of the rotating housing 122, and is connected to the rotary shaft 132.

Figure 3A:
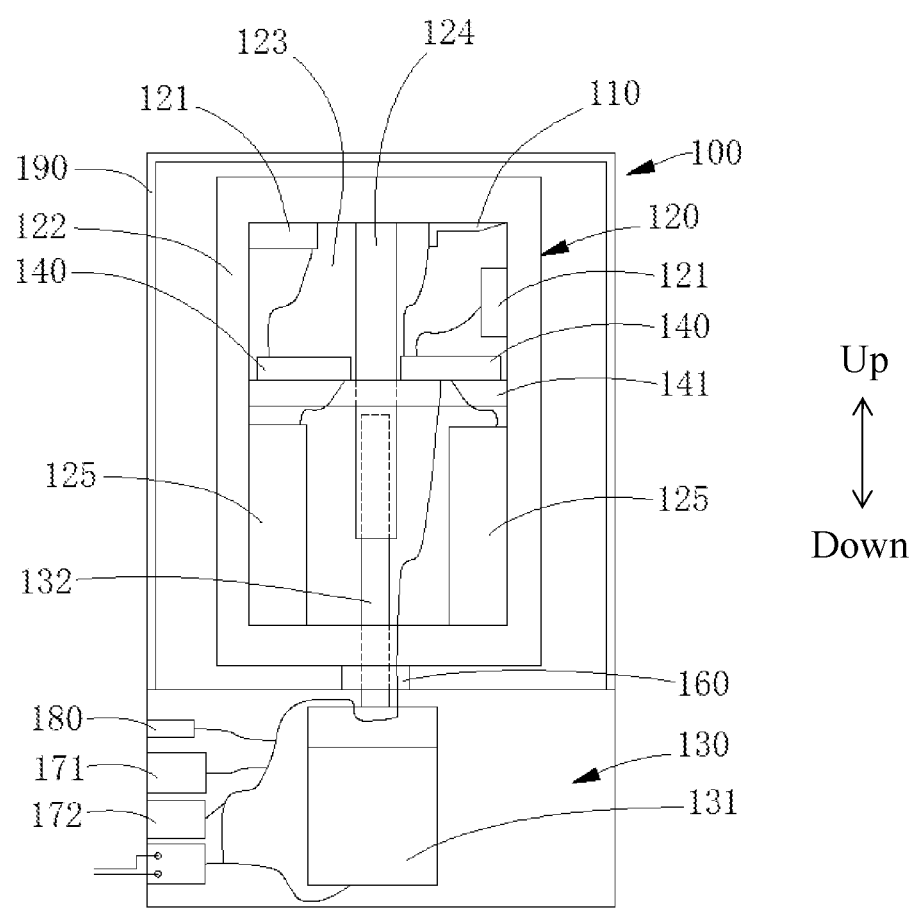
FIG. 3A is a schematic diagram of a CPE provided by an embodiment of the present disclosure.
Figure 3B:
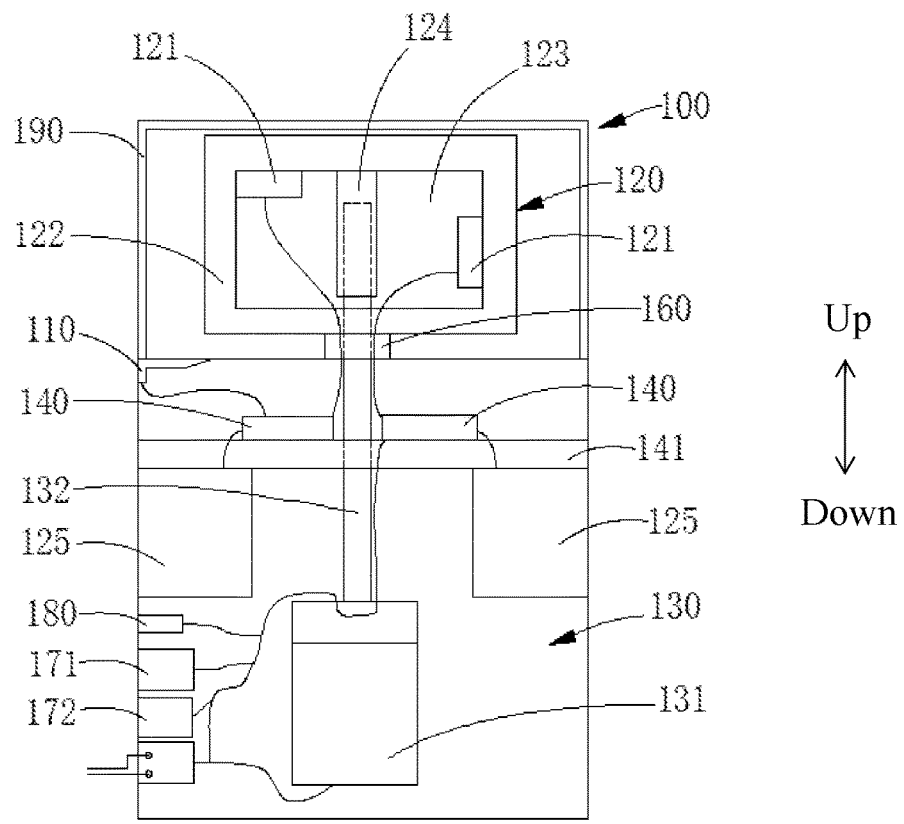
FIG. 3B is a schematic diagram of a CPE provided by an embodiment of the present disclosure.
Figure 3C:
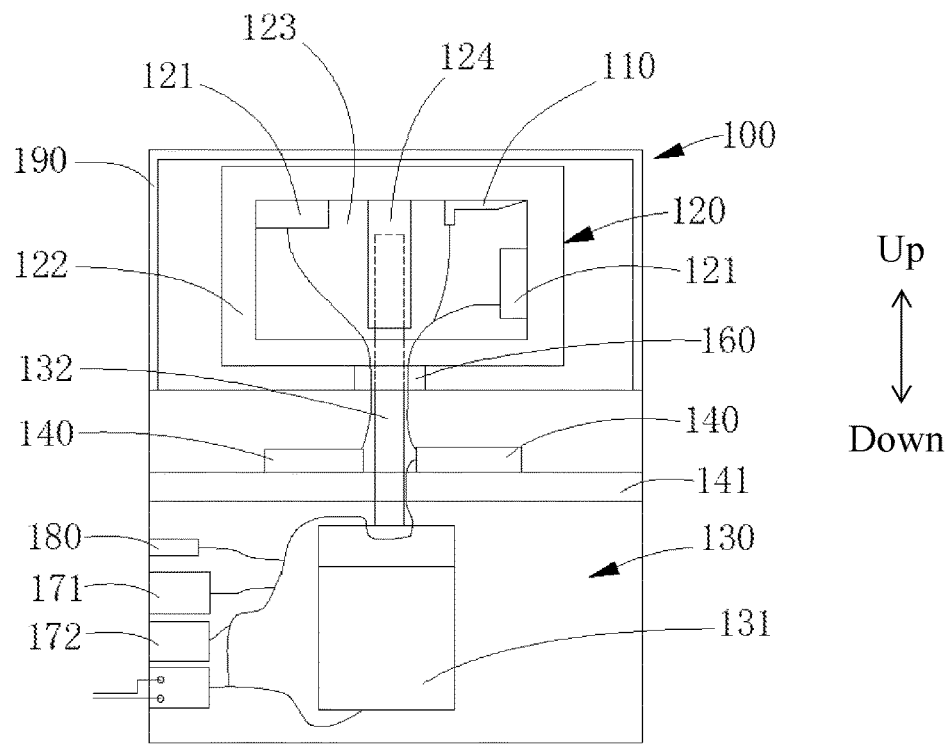
FIG. 3C is a schematic diagram of a CPE provided by an embodiment of the present disclosure.
Figure 3D:
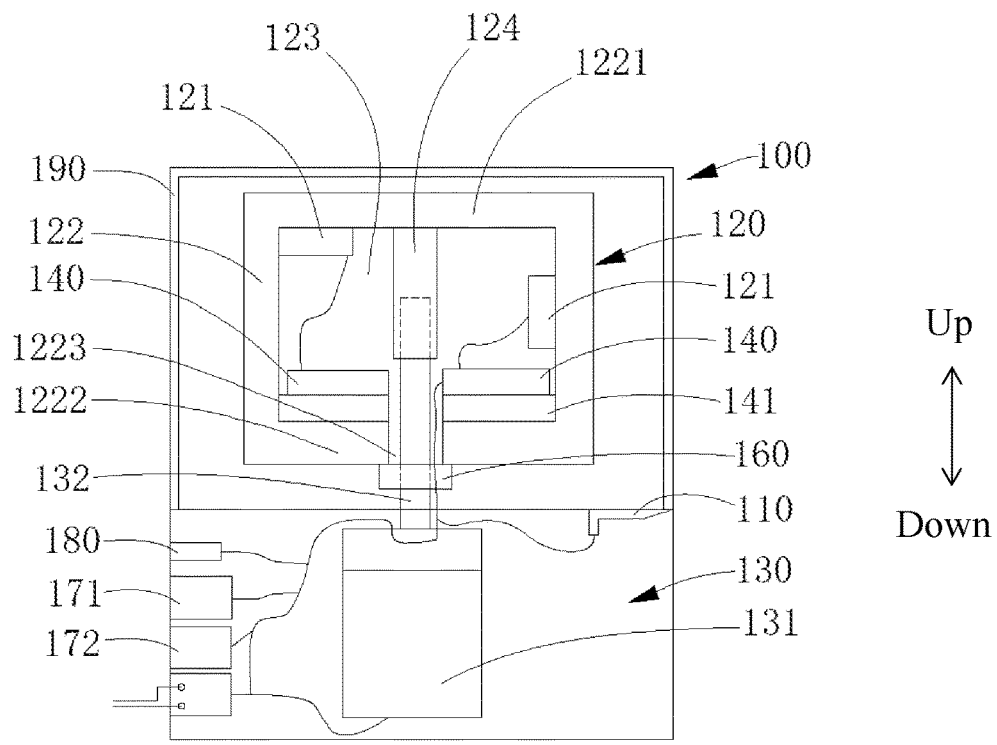
FIG. 3D is a schematic diagram of a CPE provided by an embodiment of the present disclosure.

In an embodiment, the arrangement of each of the Wi-Fi access module 110 and the control processing module 140 has various implementations, which are not specifically limited in this embodiment. As shown in FIG. 3A, the Wi-Fi access module 110 and the control processing module 140 are both disposed inside the first accommodating space 123. As shown in FIG. 3B, the Wi-Fi access module 110 and the control processing module 140 are both disposed inside the base 130. As shown in FIG. 3C, the Wi-Fi access module 110 is disposed inside the first accommodating space 123, and the control processing module 140 is disposed inside the base 130. As shown in FIG. 3D, the Wi-Fi access module 110 is disposed inside the base 130, and the control processing module 140 is disposed inside the first accommodating space 123. It is worth noting that when the Wi-Fi access module 110 and the control processing module 140 adopt the implementation as shown in FIG. 3C or 3D, each of the rotating housing 122 and the base 130 is provided with a wire through hole through which wires connected to the Wi-Fi access module 110 and the control processing module 140 pass. In addition, when the rotary shaft 132 is arranged as shown in FIG. 2B, that is, the rotary shaft 132 passes through the bottom 1222 of the rotating housing 122 and is connected to the inner surface of the top 1221 of the rotating housing 122, a gap in the through hole 1223 through which the rotary shaft 132 passes can be used as the wire through hole.

In an embodiment, to facilitate installation of the control processing module 140 and realize support for the control processing module 140, a support frame is provided inside the first accommodating space 123 or inside the base 130, and the control processing module 140 is installed inside the support frame. As shown in FIG. 3A, the support frame 141 is disposed inside the first accommodating space 123 and is provided with a hole through which the rotary shaft sleeve 124 can pass such that the support frame 141 is installed over the shaft sleeve 124 and connects to the shaft sleeve 124. The support frame 141 may be made of metal to achieve good heat dissipation of the control processing module 140.

In an embodiment, the Wi-Fi access module 110 is a Wi-Fi antenna, or an integrated module including a radio frequency circuit and a Wi-Fi antenna, which is not specifically limited in this embodiment. When the Wi-Fi access module 110 is a Wi-Fi antenna, the Wi-Fi access module 110 and the control processing module 140 may be connected through a radio frequency coaxial cable, and the control processing module 140 includes a radio frequency circuit module and a baseband signal processing module that are connected to each other. The Wi-Fi access module 110 and the control processing module 140 in collaboration realize network access processing on a user side. When the Wi-Fi access module 110 is an integrated module including a radio frequency circuit and a Wi-Fi antenna, the Wi-Fi access module 110 and the control processing module 140 may be connected by wires such as twisted pairs, and the control processing module 140 has a baseband signal processing module. The Wi-Fi access module 110 and the control processing module 140 in collaboration realize network access processing on the user side. It is worth noting that a radio frequency circuit used to transmit and receive a Wi-Fi signal may be used as the radio frequency circuit in this embodiment in some cases, which belongs to a conventional design in the art and therefore will not be described in detail herein.

It is worth noting that, in some implementations, there is one or more than two Wi-Fi access modules 110. When there are more than two Wi-Fi access modules 110, the two or more Wi-Fi access modules 110 are staggered at different positions in the first accommodating space 123 or at different positions in the base 130. For example, the two or more Wi-Fi access modules 110 are staggered at different positions attached to the inner surface of the rotating housing 122.

In an embodiment, the mmWave access module 121 is a mmWave antenna, or an integrated module including a radio frequency circuit and a mmWave antenna, which is not specifically limited in this embodiment. When the mmWave access module 121 is a mmWave antenna, the mmWave access module 121 and the control processing module 140 may be connected through a radio frequency coaxial cable, and the control processing module 140 includes a radio frequency circuit module and a baseband signal processing module that are connected to each other. The mmWave access module 121 and the control processing module 140 in collaboration realize network connection processing on a network side. When the mmWave access module 121 is an integrated module including a radio frequency circuit and a mmWave antenna, the mmWave access module 121 and the control processing module 140 may be connected by wires such as twisted pairs, and the control processing module 140 has a baseband signal processing module. The mmWave access module 121 and the control processing module 140 in collaboration realize network connection processing on the network side. It is worth noting that a radio frequency circuit used to transmit and receive a 5G signal may be used as the radio frequency circuit in this embodiment in some cases, which belongs to a conventional design in the art and therefore will not be described in detail herein.

It is worth noting that, in some implementations, there is one or more than two mmWave access modules 121. When there are more than two mmWave access modules 121, the two or more mmWave access modules 121 are staggered at different positions in the first accommodating space 123. For example, the two or more mmWave access modules 121 are staggered at different positions attached to the inner surface of the rotating housing 122. As the more than two mmWave access modules 121 are staggered at different positions in the first accommodating space 123, the mmWave access modules 121 can receive 5G signals from different directions, thereby effectively expanding a range of transmitting and receiving a beamforming signal.

In an embodiment, the CPE 100 further includes a non-mmWave mobile network access module (which is not shown in the drawing), which is connected to the control processing module 140 and disposed inside the first accommodating space 123 or inside the base 130. It is worth noting that the non-mmWave mobile network access module may be at least one of the sub 6 GHz network access modules including a 2G network access module, a 3G network access module, a 4G network access module, and a 5G network access module. In addition, the number of non-mmWave mobile network access modules is not specifically limited in this embodiment, and the types and number of non-mmWave mobile network access modules may be appropriately selected according to actual application cases.

It is worth noting that according to different specific mobile network types to which the non-mmWave mobile network access module is applied, the non-mmWave mobile network access module may be an antenna corresponding to a mobile network type or an integrated module including a radio frequency circuit and an antenna corresponding to a mobile network type, which is not specifically limited in this embodiment. When the non-mmWave mobile network access module is an antenna, the non-mmWave mobile network access module and the control processing module 140 may be connected through a radio frequency coaxial cable, and the control processing module 140 includes a radio frequency circuit module and a baseband signal processing module that are connected to each other. The non-mmWave mobile network access module and the control processing module 140 in collaboration realize network connection processing on the network side. When the non-mmWave mobile network access module is an integrated module including a radio frequency circuit and an antenna, the non-mmWave mobile network access module and the control processing module 140 may be connected by through wires such as twisted pairs, and the control processing module 140 has a baseband signal processing module. The non-mmWave mobile network access module and the control processing module 140 in collaboration realize network connection processing on the network side. It is worth noting that a radio frequency circuit used to transmit and receive sub 6 GHz signals such as a 2G signal, a 3G signal, a 4G signal, or a 5G signal may be used as the radio frequency circuit in this embodiment in some cases, which belongs to a conventional design in the art and therefore will not be described in detail herein.

In an embodiment, the rotating housing 122 is provided with an electrically non-conductive shielding area, and the mmWave access module 121 is provided in the first accommodating space 123 and within the electrically non-conductive shielding area. For example, the rotating housing 122 includes an upper half and a lower half, where the upper half of the rotating housing 122 may be made of an electrically non-conductive shielding material such as plastic or glass, thereby forming an electrically non-conductive shielding area. In a case that the mmWave access module 121 is disposed in the electrically non-conductive shielding area, the electrically non-conductive shielding area does not affect normal transmission of a radio frequency signal, thereby ensuring normal communication between the mmWave access module 121 and the 5G network. In addition, the lower half of the rotating housing 122 may be made of a metallic material, to support devices and components disposed in the rotating housing 122. The lower half of the rotating housing 122 made of a metallic material can further radiate heat from the devices or components disposed in the rotating housing 122, thereby ensuring operation stability of the devices or components.

In an embodiment, the CPE 100 further includes a sound playing module 125 for playing a sound signal such as an alert tone, voice, or music, and the sound playing module 125 is connected to the control processing module 140. As shown in FIG. 3A, the sound playing module 125 is disposed inside the first accommodating space 123. As shown in FIG. 3B, the sound playing module 125 is alternatively disposed inside the base 130. It is worth noting that, in some implementations, there is one or more than two sound playing modules 125. The sound playing module 125 may be a buzzer or a loudspeaker, which may be appropriately selected according to an actual use requirement and is not specifically specified in this embodiment. In a case that there are two or more loudspeakers used as the sound playing modules 125, as shown in FIG. 3A or 3B, the two or more sound playing modules 125 are disposed at different positions in the first accommodating space 123 or at different positions in the base 130, thereby forming a stereo device and improving user experience.

In an embodiment, the CPE 100 further includes a microphone (which is not shown in the drawing) for receiving voice information of a user, the microphone is connected to the control processing module 140, and the microphone is disposed inside the first accommodating space 123 or inside the base 130. It is worth noting that when the CPE 100 has both the sound playing module 125 and the microphone, the CPE 100 may function as a smart loudspeaker, for example, can be used for realizing voice control on smart household or voice control playback of pre-produced audio after intelligent learning of user's voice. The pre-produced audio may include audio signals such as songs, or pre-produced recordings.

In an embodiment, when the CPE 100 includes any one of the sound playing module 125 and the microphone, the control processing module 140 may include a first audio circuit (which is not shown in the drawing) corresponding to the sound playing module 125 or a second audio circuit (which is not shown in the drawing) corresponding to the microphone; or when the CPE 100 includes both the sound playing module 125 and the microphone, the control processing module 140 may include both the first audio circuit corresponding to the sound playing module 125 and the second audio circuit corresponding to the microphone. The first audio circuit can play, through the sound playing module 125, an audio signal processed by the control processing module 140, and the second audio circuit can send a user voice signal from the microphone to the control processing module 140 for related audio processing. It is worth noting that both the first audio circuit and the second audio circuit in this embodiment can use an existing audio circuit, which belongs to a conventional design in the art and therefore will not be described in detail herein.

Figure 4:
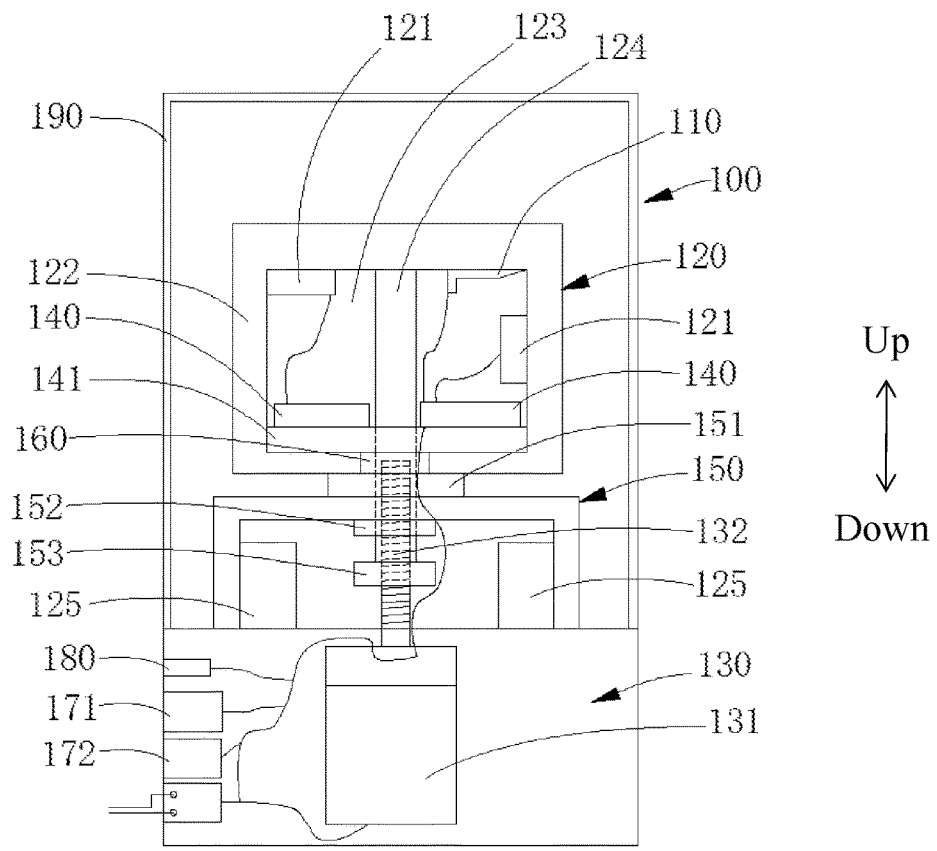
FIG. 4 is a schematic diagram of a CPE provided by an embodiment of the present disclosure.

In an embodiment, as shown in FIG. 4, the CPE 100 further includes a support body 150 connected to the base 130, the support body 150 being provided with a torsion spring 151 and a retaining ring 152. The rotating body 120 is provided with a rotary shaft sleeve 124 which passes through the support body 150, the torsion spring 151, and the retaining ring 152 and is provided over the rotary shaft 132. The torsion spring 151 is connected to the rotary shaft sleeve 124 and generates a pretension force on the rotary shaft sleeve 124. Here, the rotary shaft 132 is a lead screw and is provided with a nut seat 153 screwed on the rotary shaft 132, and the nut seat 153 is connected to the rotary shaft sleeve 124.

In an embodiment, as the torsion spring 151 is connected to the rotary shaft sleeve 124 and generates a pretension force on the rotary shaft sleeve 124, in a case that the rotary shaft 132 does not overcome the pretension force, the torsion spring 151 keeps the rotary shaft sleeve 124, the nut seat 153, and the rotating body 120 in balanced positions, that is, the rotary shaft sleeve 124, the nut seat 153, and the rotating body 120 do not rotate with the rotation of the rotary shaft 132. Therefore, the nut seat 153 can vertically move along the rotary shaft 132, thereby driving the rotating body 120 to vertically move to change the position of the mmWave access module 121. When the nut seat 153 moves up along the rotary shaft 132 and comes into contact with the retaining ring 152, the retaining ring 152 blocks the upward movement of the nut seat 153, and at this time, the nut seat 153 has reached the maximum upward distance. As the rotary shaft 132 continues to rotate, the rotary shaft 132 can overcome the pretension force generated by the torsion spring 151 and drive the nut seat 153, the rotary shaft sleeve 124, and the rotating body 120 to rotate with the rotary shaft 132, that is, the rotating body 120 get involved in rotation than the upward movement. In this way, the position of the mmWave access module 121 is changed, so that the mmWave access module 121 can overcome obstruction problems, sudden strong interference, sudden base station failure, or the like and keep the communication link between the CPE and the 5G network unblocked, thereby improving the communication quality and user experience.

It is worth noting that, when the rotating body 120 rotates with the rotary shaft 132, if the rotary shaft 132 rotates in a reverse direction than before, the rotating body 120 rotates in the reverse direction with the rotary shaft 132. Then, when the rotating body 120, during rotation in the reverse direction, reaches the balanced position, the rotating body 120 no longer rotates. At this time, the nut seat 153 moves down along the rotary shaft 132, and correspondingly, the rotating body 120 moves down along the rotary shaft 132 with the nut seat 153.

In an embodiment, the rotary shaft 132 may be a ball screw, and can produce a better movement effect when fitted with the nut seat 153, making the rotating body 120 move more smoothly and stably.

Figure 5A:
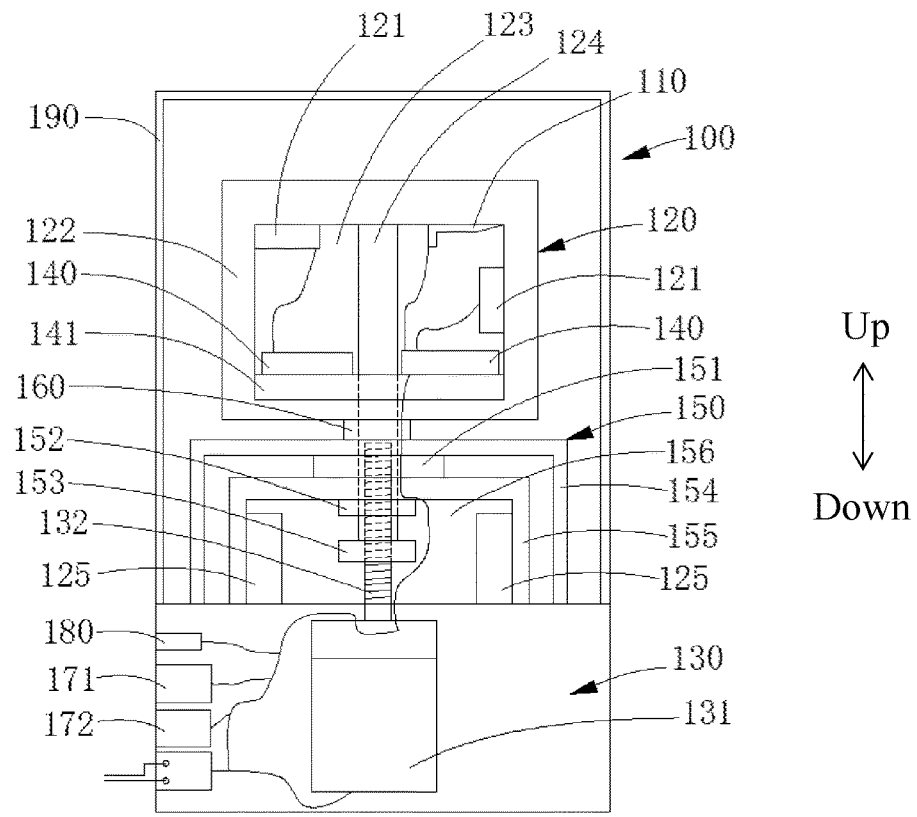
FIG. 5A is a schematic diagram of a CPE provided by an embodiment of the present disclosure.

In an embodiment, as shown in FIG. 5A, the support body 150 includes a first support housing 154 and a second support housing 155 disposed inside the first support housing 154, the torsion spring 151 is disposed between the first support housing 154 and the second support housing 155, and the retaining ring 152 is disposed on an inner side wall of the second support housing 155.

In an embodiment, a gap is defined between the first support housing 154 and the second support housing 155, and the torsion spring 151 is disposed stably in the gap utilizing mutual force between the first support housing 154 and the second support housing 155. It is worth noting that because the retaining ring 152 is provided on the inner side wall of the second support housing 155, the rotary shaft sleeve 124 passes through the first support housing 154 and the second support housing 155. As shown in FIG. 5A, the nut seat 153 connected to the rotary shaft sleeve 124 is provided inside the second support housing 155 and below the retaining ring 152.

In an embodiment, the second support housing 155 defines a second accommodating space 156, and the second accommodating space 156 is provided with at least one of the control processing module 140, the Wi-Fi access module 110, the non-mmWave mobile network access module, the sound playing module 125, and the microphone.

Figure 5B:
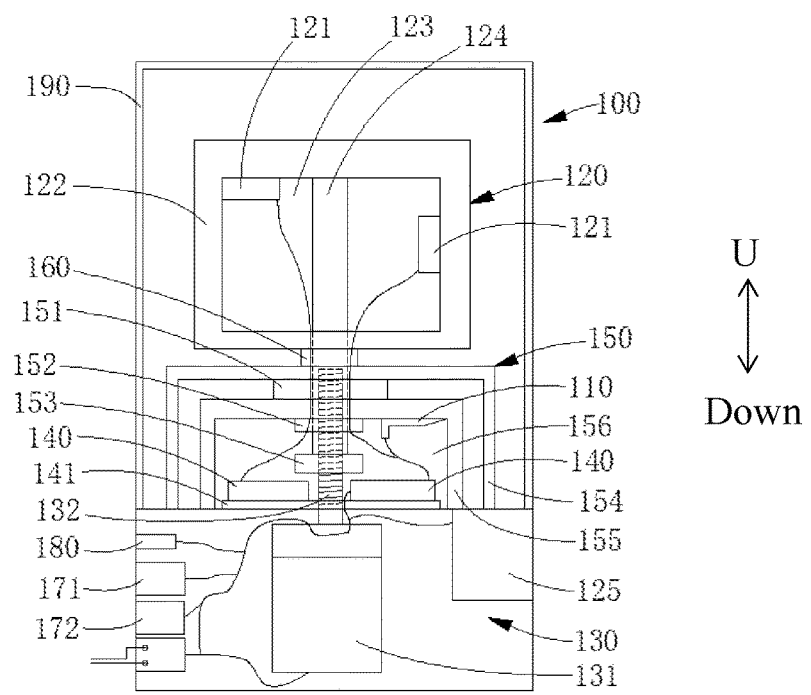
FIG. 5B is a schematic diagram of a CPE provided by an embodiment of the present disclosure.

In an embodiment, the second accommodating space 156 can provide additional installation space for installing devices or components for the CPE 100. The second accommodating space 156 can be used for installing different devices or components according to actual use situations, which is not specifically limited in this embodiment. As shown in FIG. 5A, the sound playing module 125 is installed in the second accommodating space 156, in which case the mmWave access module 121, the Wi-Fi access module 110, and the control processing module 140 are installed in the first accommodating space 123, and the rotary driving device 131 is installed in the base 130. As shown in FIG. 5B, the Wi-Fi access module 110 and the control processing module 140 are installed in the second accommodating space 156, in which case the mmWave access module 121 is installed in the first accommodating space 123, and the rotary driving device 131 and the sound playing module 125 are installed in the base 130.

In an embodiment, the CPE 100 further includes an angle sensor 160, where the angle sensor 160 is connected to the control processing module 140 and is disposed on the rotary shaft 132 or the rotating body 120.

In an embodiment, the angle sensor 160 can detect a rotation angle of the rotating body 120, and the control processing module 140 can adjust the rotation of the rotating body 120 according to the detected rotation angle. In this way, the control processing module 140 determines an orientation of the mmWave access module 121, to control the mmWave access module 121 to overcome obstruction problems, sudden strong interference, sudden base station failure, or the like and keep the communication link between the CPE and the 5G network unblocked, thereby improving the communication quality and user experience.

In an embodiment, depending on a type of the angle sensor 160 and a specific structure of the CPE 100, the arrangement of the angle sensor 160 has various implementations. For example, when the rotary shaft 132 is directly connected to the rotating body 120, the angle sensor 160 may be provided over the rotary shaft 132 as shown in FIG. 2A or 2B. In addition, the angle sensor 160 may alternatively be disposed at the bottom of the rotating body 120. For another example, when the rotary shaft 132 is connected to the rotating body 120 via the rotary shaft sleeve 124, the angle sensor 160 may be provided over the rotary shaft sleeve 124 as shown in FIG. 4 or 5A. In addition, the angle sensor 160 may alternatively be disposed at the bottom of the rotating body 120.

In an embodiment, the CPE 100 further includes a network port, which is connected to the control processing module 140 and provided inside the base 130. The network port may include at least one of a Local Area Network (LAN) port 171 and a Wide Area Network (WAN) port 172.

As shown in FIG. 3A, both the LAN port 171 and the WAN port 172 are provided inside the base 130, where the LAN port 171 and the WAN port 172 can be used for wired connection to the network, providing the CPE 100 with a network access function. It is worth noting that, when the CPE 100 includes both the LAN port 171 and the WAN port 172, the control processing module 140 may include a line switching circuit (which is not shown in the drawing) connected to both the LAN port 171 and the WAN port 172 for switching a type of wired network connection of the CPE 100. It is worth noting that the line switching circuit in this embodiment can use an existing switching circuit, which belongs to a conventional design in the art and therefore will not be described in detail herein.

In an embodiment, the CPE 100 further includes a power supply module (which is not shown in the drawing) for supplying necessary operating power to the CPE 100. The power supply module may have various implementations, which are not specifically limited in this embodiment. For example, the power supply module may be a conventional power supply circuit. In this case, the CPE 100 may be provided with a power plug to which the power supply module is connected. For another example, the power supply module may be a built-in rechargeable power supply. In this case, the CPE 100 may be provided with a charging interface to which the power supply module is connected.

In an embodiment, as shown in FIG. 3A, the CPE 100 further includes a status indicator 180. The status indicator 180 is connected to the control processing module 140, and may be used to notify the user of a current status of the CPE 100, such as an operating state, a standby state, or a charging state.

In an embodiment, as shown in FIG. 3A, the CPE 100 further includes an electrically non-conductive shielding shell 190 connected to the base 130, and the rotating body 120 is disposed inside the electrically non-conductive shielding shell 190. The electrically non-conductive shielding shell 190 may be made of an electrically non-conductive shielding material such as plastic or glass, which does not affect normal transmission of radio frequency signals, and can keep the CPE 100 neat and free of dust inside.

In an embodiment, the control processing module 140 includes a memory and a processor, where the memory and the processor may be connected by a bus or by other means.

As a non-transitory computer-readable storage medium, the memory can be used to store a non-transitory software program and a non-transitory computer-executable program. In addition, the memory may include a high-speed random access memory and a non-transitory memory, for example, at least one magnetic disk storage device, a flash memory device, or another non-transitory solid-state storage device. In some embodiments, the memory may include memories remotely located with respect to the processor, and these remote memories may be connected to the processor via a network. Examples of the above-mentioned network include the Internet, an intranet, a local area network, a mobile communication network, and a combination thereof.

Based on the above structure of the CPE, various embodiments of a control method for the CPE are described below.

Figure 6:
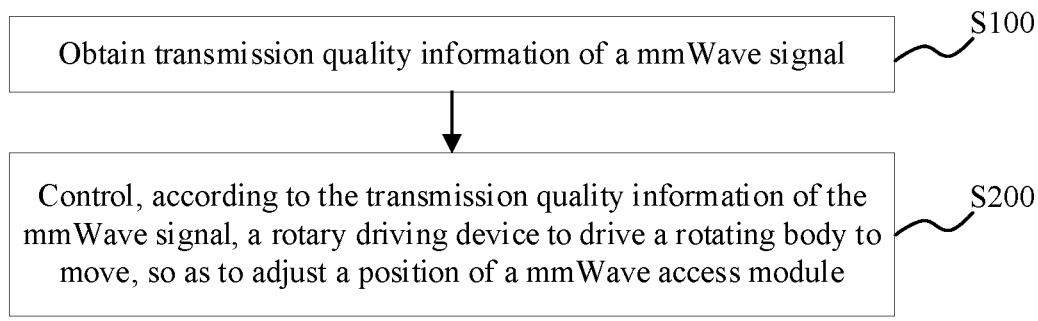
FIG. 6 is a flowchart of a control method for a CPE provided by an embodiment of the present disclosure.

As shown in FIG. 6, a flowchart of a control method for a CPE provided by an embodiment of the present disclosure is depicted. The control method includes but is not limited to steps S100 and S200.

At S100, transmission quality information of a mmWave signal is obtained.

In an embodiment, the CPE can periodically obtain the transmission quality information of the mmWave signal through a mmWave access module, and adjust a position of the mmWave access module according to the transmission quality information of the mmWave signal in a subsequent step.

In an embodiment, the transmission quality information of the mmWave signal may include, but is not limited to, Reference Signal Received Power (RSRP), Reference Signal Received Quality (RSRQ), and Signal to Interference plus Noise Ratio (SINR).

At S200, a rotary driving device is controlled according to the transmission quality information of the mmWave signal to drive a rotating body to move, so as to adjust a position of the mmWave access module.

In an embodiment, in response to the obtained transmission quality information of a mmWave signal indicating smooth connection of a current communication link, there is no need to control the rotary driving device to drive the rotating body to move for the purpose of changing the position of the mmWave access module. In response to the obtained transmission quality information of a mmWave signal indicating poor connection of the current communication link, the rotating body is driven to move to change the position of the mmWave access module, so as to change a communication position and environment, thereby improving communication quality between the mmWave access module and a 5G network and improving user experience.

In an embodiment, controlling, according to the transmission quality information of the mmWave signal, the rotary driving device to drive the rotating body to move has various implementations. For example, it may be determined whether communication quality of the current communication link is poor according to whether the transmission quality information of the mmWave signal is less than a specific set threshold, and when it is determined that the communication quality of the current communication link is poor, the rotary driving device is controlled to drive the rotating body to move. For another example, it may be determined whether communication quality of the current communication link is poor according to whether the transmission quality information of the mmWave signal does not meet a preset communication quality condition and whether the transmission quality information of the mmWave signal does not meet the preset communication quality condition for a duration exceeding a specific preset duration. When it is determined that the communication quality of the current communication link is poor, the rotary driving device is controlled to drive the rotating body to move.

In an embodiment, in application of the control method including steps S100 and S200, when a communication link between the CPE and the 5G network is affected by obstruction problems, sudden strong interference, sudden base station failure, or the like, the rotary driving device can be controlled to drive the rotating body to move, so as to drive the mmWave access module to move. In this way, the position of the mmWave access module can be adjusted and the communication link between the mmWave access module and the 5G network can be changed, so that the mmWave access module can overcome obstruction problems, sudden strong interference, sudden base station failure, or the like and keep the communication link between the CPE and the 5G network unblocked, thereby improving the communication quality and user experience.

In an embodiment, step S200 includes, but is not limited to, the following step.

At S210, the rotary driving device is controlled according to the transmission quality information of the mmWave signal to drive the rotating body to vertically move, or rotate, or both, so as to adjust the position of the mmWave access module.

In an embodiment, in response to the obtained transmission quality information of a mmWave signal indicating poor connection of the current communication link, the rotary driving device can be controlled to drive the rotating body to vertically move, or rotate, or both, so as to drive the mmWave access module to rotate. In this way, the position of the mmWave access module can be adjusted and therefore communication quality between the mmWave access module and the 5G network can be improved.

In an embodiment, step S210 includes, but is not limited to, the following step.

At S211, when the transmission quality information of the mmWave signal does not meet the preset communication quality condition for a duration exceeding a first preset duration, the rotary driving device is controlled to drive the rotating body to vertically move, or rotate, or both, so as to adjust the position of the mmWave access module until the transmission quality information of the mmWave signal meets the preset communication quality condition.

In an embodiment, when the transmission quality information of the mmWave signal does not meet the preset communication quality condition for a duration exceeding the first preset duration, it is indicated that communication quality of the current communication link is not good. In order to keep the communication link between the mmWave access module and the 5G network unblocked, the position of the mmWave access module can be adjusted and the communication link between the mmWave access module and the 5G network can be changed until the transmission quality information of the mmWave signal meets the preset communication quality condition. When the transmission quality information of the mmWave signal meets the preset communication quality condition, it is indicated that the mmWave access module overcomes obstruction problems, sudden strong interference, sudden base station failure, or the like and keeps the communication link between the CPE and the 5G network unblocked, and therefore improves communication quality and user experience.

In an embodiment, the preset communication quality condition is that a specific communication quality indicator reaches a specified value, or a plurality of communication quality indicators each reach a corresponding preset value, which is not specifically limited in this embodiment. For example, in the case the preset communication quality condition is that a plurality of communication quality indicators each reach a corresponding preset value, the preset communication quality condition may be: an RSRP is continuously lower than ~110 dBm, a bit error rate is continuously higher than 10%, and a throughput is lower than 50 Mbps.

It is worth noting that mobility management of CPE usually only involves beam switching, but in a case requiring load balancing, for example, a network congestion case, cell handover is also involved. Therefore, mobility management also needs to ensure service continuity for the CPE when the communication link in the network changes, including system message reception and paging for CPE in idle state or deactivated mode, and data transmission continuity for CPE in connected mode. During measurement of RSRP, RSRQ or SINR, if RSRP, RSRQ or SINR meets a specific condition, an event A1 to an event A6 and an event B1 to an event B2 will be triggered. When a trigger condition no longer exists, the CPE will stop reporting and leave the corresponding event. Here, a measurement event is based on a Synchronization Signal Block (SSB) or a Channel State Information Reference Signal (CSI-RS), which reflects measurement results of beams configurable to the network and cell quality parameters represented by linear averages of the beams involved in calculation. Such CPE measurement and reporting mechanism under network control can ensure that a mmWave access module in a multi-antenna transmission mode can camp on an optimal beam or cell in most cases. However, if the mmWave access module of the CPE is severely blocked, communication quality could be very poor even the mmWave access module camps on the optimal beam. In this case, an RSRP, a Channel Quality Indicator (CQI) calculated based on SINR, a data block error rate (BLER) and a throughput (TUP) under a Modulation and Coding Scheme (MCS) adjusted according to the CQI all show poor values. In order to avoid faulty determination to drive the rotating body to move due to one single poor indicator, the preset communication quality condition is specified as that a plurality of communication quality indicators each reach a corresponding preset value, for example, the BLER is continuously higher than 10%, the RSRP is continuously lower than −110 dBm, the TUP is continuously lower than 50 Mbps, a hysteresis and trigger delay time is 2 to 3 seconds, etc. When the transmission quality information of the mmWave signal meets these conditions, step S211 in this embodiment is executed.

In an embodiment, the first preset duration is appropriately set according to an actual use situation, for example, the first preset duration may be 500 ms or 2000 ms, which is not specifically limited in this embodiment.

It is worth noting that when wireless link connection fails and the CPE is disconnected from the network, it may also be considered that the transmission quality information of the mmWave signal does not meet the preset communication quality condition.

In an embodiment, controlling rotary driving device to drive the rotating body to vertically move, or rotate, or both in step S211 includes, but is not limited to, the following steps.

At S2111, the rotary driving device is controlled to drive the rotating body to vertically move, or rotate, or both by a preset motion magnitude.

In an embodiment, in driving the rotating body to vertically move, the preset motion magnitude is a preset vertical moving distance; in driving the rotating body to rotate, the preset motion magnitude is a preset rotation angle; and in driving the rotating body to vertically move and rotate, the preset motion magnitude includes a preset vertical moving distance and a preset rotation angle. It is worth noting that the preset vertical moving distance and the preset rotation angle may be appropriately set according to an actual use situation, for example, the preset rotation angle may be 10 degrees or 120 degrees, which is not specifically limited in this embodiment.

In an embodiment, after the rotary driving device is controlled to drive the rotating body to vertically move, or rotate, or both by the preset motion magnitude, the CPE measures the RSRP, RSRQ or SINR and reports a result, and performs beam switching and even cell re-selection and handover. When the CPE performs beam switching or cell handover, if the number of switching/handover failures is greater than a preset number, the CPE will control the rotary driving device to drive the rotating body to vertically move, or rotate, or both by the preset motion magnitude again, until beam switching is successful or a cell handover is successful, that is, until the transmission quality information of the mmWave signal meets the preset communication quality condition. At that time, the CPE will camps on a new beam or cell and continue to monitor whether the transmission quality information of the mmWave signal meets the preset communication quality condition.

Figure 7:
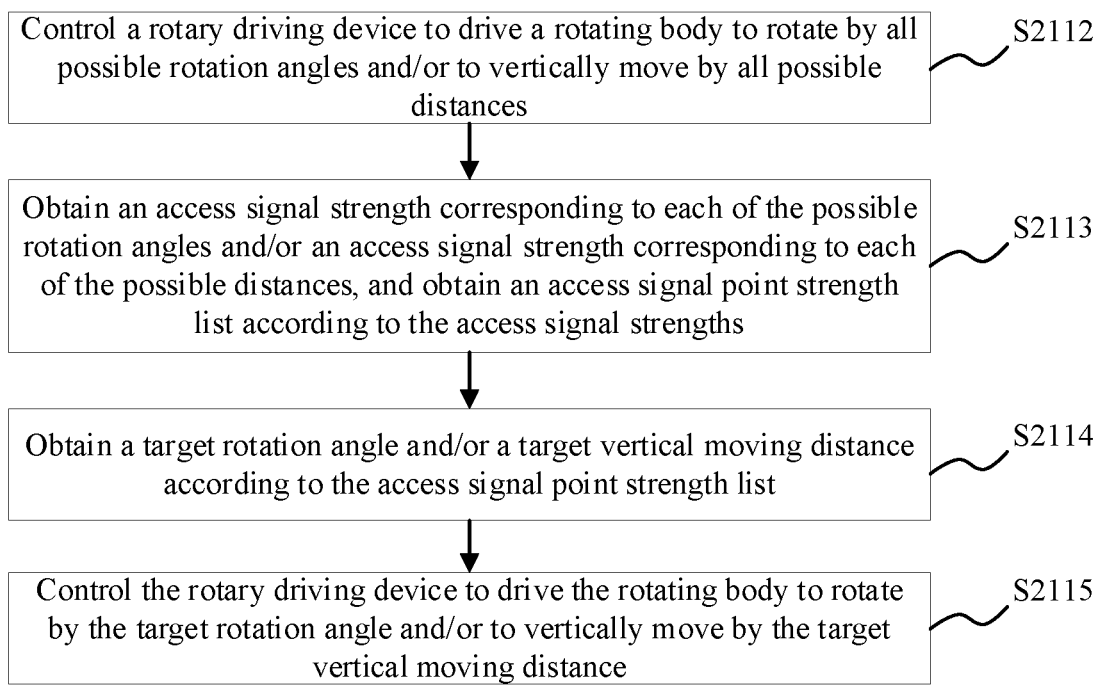
FIG. 7 is a flowchart of a control method for a CPE provided by an embodiment of the present disclosure.

Additionally, referring to FIG. 7, in an embodiment, controlling rotary driving device to drive the rotating body to vertically move, rotate or both in step S211 includes, but is not limited to, the following steps.

At S2112, the rotary driving device is controlled to drive the rotating body to rotate by all possible rotation angles and/or vertically move by all possible distances.

At S2113, an access signal strength corresponding to each of the possible rotation angles is obtained and/or an access signal strength corresponding to each of the possible distances are obtained, and an access signal point strength list is obtained according to the access signal strengths.

At S2114, a target rotation angle, or a target vertical moving distance, or both are obtained according to the access signal point strength list.

At S2115, the rotary driving device is controlled to drive the rotating body to rotate by the target rotation angle and/or to vertically move by the target vertical moving distance.

It should be noted that steps S2112 to S2115 in this embodiment and step S2111 in the foregoing embodiment belong to parallel technical schemes.

In an embodiment, when the transmission quality information of the mmWave signal does not meet the preset communication quality condition for a duration exceeding the first preset duration, the CPE drives the rotating body to move, so as to drive the mmWave access module to move. In addition, the CPE performs traversal statistics based on the movement of the mmWave access module, and makes intelligent decision according to a result obtained after the traversal statistics, so as to decide a position corresponding to the greatest access signal strength, and then obtain a target rotation angle or a target vertical moving distance according to the position. Then, the CPE drives the mmWave access module to move for the second time by the target rotation angle or the target vertical moving distance, to make the mmWave access module move to the position corresponding to the greatest access signal strength. In this case, the CPE can re-perform beam measurement and perform random access based on network mobility management. It is worth noting that in the process of traversal statistics by the CPE based on the movement of the mmWave access module, the CPE maintains an original connection mode to the 5G network, to maintain connection to the 5G network and avoid the problem of network disconnection.

In an embodiment, after the access signal point strength list is obtained in step S2113, the CPE further sorts the access signal strengths in the access signal point strength list in descending order. When the CPE performs network access according to the strongest signal position corresponding to the greatest access signal strength in the access signal point strength list, if communication quality of the strongest signal position becomes poor, the CPE determines the second greatest access signal strength in the access signal point strength list, and then obtain the second strongest signal position corresponding to the second greatest access signal strength, so that the CPE performs network access according to the second strongest signal position, and so on, until the CPE can be stably connected to the 5G network.

In an embodiment, during traversal statistics by the CPE based on the movement of the mmWave access module, data required for traversal statistics includes but is not limited to the RSRP, the RSRQ, the SINR, the CQI, a Precoder Matrix Indicator (PMI), a Rank Indicator (RI), and a Sounding Reference Signal (SRS). After obtaining the above data, the CPE uses the Bayes' theorem or a deep learning method for statistical analysis, which is not specifically limited in this embodiment.

In an embodiment, statistical analysis performed by using the Bayes' theorem includes the following steps:
  establishing a model of total probability: putting all observed values and unobserved values together to obtain a formula of total probability;
  obtaining conditional probabilities based on observed data: given the observed data, obtaining conditional probabilities of all variables and then calculate an appropriate posterior probability; and
  drawing a corresponding conclusion after a fitting status of the model and a meaning of the posterior probability are evaluated.

A formula for the posterior probability is:

$$P(B_i \mid A) = \frac{P(B_i)P(A \mid B_i)}{\sum_{i=1}^{n} P(B_i)P(A \mid B_i)}$$

where $P(B_i \mid A)$ is a posterior probability, $P(A \mid B_i)$ is a conditional probability, and $P(B_i)$ is a prior probability.

In the above formula, $P(B_i)$ can be calculated from historical data (that is, a training set). Assuming that polling is performed every 10 degrees during a 360-degree rotation, there will be 36 positions, that is, a probability of each P(position i) is 1/36.

Data reporting by the CPE under network monitoring during the rotation may be divided into event-triggered reporting and periodically triggered reporting. Generally, reported content includes the RSRP, RSRQ, SINR, CQI, PMI, RI or SRS, etc., and may further include the MCS, BLER and TUP, etc. in statistical analysis. It is worth noting that the corresponding probability statistical analysis can be performed according to only the RSRP and SINR to classify current values into extremely strong point, strong point, medium point, weak point, and extremely weak point. General empirical values may be referred to as follows (the empirical values may be adjusted according to an actual situation):
  Extremely strong point: RSRP>−85 dBm, and SINR>25;
  Strong point: RSRP-85 dBm to −95 dBm, and SINR=16 to 25;
  Medium point: RSRP=−95 dBm to −105 dBm, and SINR=11 to 15;
  Weak point: RSRP=−105 dBm to −115 dBm, and SINR=3 to 10;
  Extremely weak point: RSRP<−115 dBm, and SINR<3.

In addition, $P(A \mid B_i) = P(a_1, a_2, a_3, \ldots, a_n \mid B_i)$. It is necessary to make an independent assumption on distribution of conditional probabilities according to a Bayesian algorithm, that is, it is assumed that features a1, a2, a3, . . . , an of all dimensions are independent of each other. Under such assumption, $P(A \mid B_i)$ can be transformed into $\prod_{k=1}^{n} P(a_k \mid B_i)$. When statistical analysis is performed only according to the RSRP and SINR, $a_k$ is equivalent to a1, a2, etc. in an event A. When strong point statistical analysis is performed only according to the RSRP and SINR, a conditional probability P(strong point|position i) is a measured probability in a case that the RSRP or SINR is classified depending on the above five strong point levels. A strong point probability of each position can be obtained by counting average parameter values of a plurality of pre-rotations, or only extremely strong point probabilities are counted, which is not specifically limited in this embodiment. Then, according to independent processing, P(Bi) is a total probability of strong point level probabilities of a plurality of parameters of the i positions.

According to the above description, $P(B_i \mid A)$ can be converted into:

$$P(B_i \mid A) = \frac{\prod_{k=1}^{n} P(a_k \mid B_i)P(B_i)}{\sum_{i=1}^{n} \prod_{k=1}^{n} P(a_k \mid B_i)P(B_i)}$$

where a specific position of a strong point can be determined according to P(position i|strong point). Then, positions are sorted in descending order according to corresponding probabilities, and a position with the highest strong point probability can be obtained. The sorted positions may be used for subsequent sequential hopping.

In the above process, strong point is equivalent to feature, and position i is equivalent to category, to find out the highest probability of a position where the strong point is located. Finally, when being obstructed and cannot improve communication quality in a short time, the CPE shifts to the position with the highest probability, and so on, until the CPE can be stably connected to the 5G network.

In an embodiment, statistical analysis performed by using the deep learning method includes the following steps:
  initializing weights and deviations with random values;
  transmitting input values to the network to obtain output values;
  calculating an error between a predicted value and an actual value;
  for each neuron with an error, adjusting a corresponding weight to reduce the error; and
  iterating until an optimal network weight is obtained.

According to the above steps, the use of deep learning method for statistical analysis is as follows: measured data is learned; the RSRP, RSRQ and SINR are used as input layers; two or three hidden layers are set in the middle; and then a Convolutional Neural Network (CNN) convolution method is employed to obtain required features.

After the access signal point strength list is obtained based on the Bayesian algorithm or the deep learning method, when the mmWave access module suffers poor signal transmission quality due to obstruction interference or other factors, the CPE controls the rotary driving device to drive the rotating body, so as to drive the mmWave access module to move, so that the mmWave access module moves to the position corresponding to the greatest access signal strength in the access signal point strength list. Then, the CPE randomly accesses the 5G network again based on monitoring of network mobility management. If signal communication quality becomes poor again, the CPE selects the next optimal mobile position for the mmWave access module and repeatedly executes the foregoing actions, to continuously ensure signal quality over the communication link between the mmWave access module and the 5G network.

An embodiment of the present disclosure provides a computer-readable storage medium storing computer-executable instructions, which, when executed by a processor or a controller, in some implementations, by the processor of the structure in any of the above-described embodiments, cause the processor or controller to perform the control method in any of the above-described embodiments. In some implementations, method steps S100 to S200 in FIG. 6 and method steps S2112 to S2115 in FIG. 7 described above are performed.

The embodiments of the present disclosure include the following technical scheme. The CPE includes a Wi-Fi access module, a rotating body, a base, and a control processing module, where the rotating body is provided with a mmWave access module; the base is provided with a rotary driving device and a rotary shaft, the rotary driving device being connected to the rotating body via the rotary shaft; and the control processing module is electrically connected to each of the Wi-Fi access module, the mmWave access module, and the rotary driving device. According to the scheme provided by the embodiments of the present disclosure, when a communication link between the CPE and a 5G network is blocked, the control processing module can control the rotary driving device to drive the rotating body to move, so as to drive the mmWave access module to move. In this way, a position of the mmWave access module can be adjusted, so that the mmWave access module can overcome obstruction problems, sudden strong interference, sudden base station failure, or the like and keep the communication link between the CPE and the 5G network unblocked, thereby improving the communication quality and user experience.

It can be understood by those having ordinary skill in the art that all or some of the steps of the methods and systems disclosed above can be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software can be distributed on computer-readable media, which can include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and can include any information transmission media.

The above is a detailed description of some embodiments of the present disclosure, but the present disclosure is not limited to the above-mentioned embodiments. Those of ordinary skill in the art can also make various equivalent modifications or replacements without departing from the scope of the present disclosure, and these equivalent modifications or replacements are all included in the scope defined by the appended claims of the present disclosure.

What is claimed is:

1. A customer premise equipment (CPE), comprising:
   a Wi-Fi access module;
   a rotating body, which is provided with a millimeter wave (mmWave) access module;
   a base, which is provided with a rotary driving device and a rotary shaft, the rotary driving device being connected to the rotating body via the rotary shaft;
   a control processing module, which is electrically connected to each of the Wi-Fi access module, the mmWave access module, and the rotary driving device,
      wherein the control processing module is configured to obtain transmission quality information of a mmWave signal through the mmWave access module, and control, according to the transmission quality information of the mmWave signal, the rotary driving device to drive the rotating body to move, so as to adjust a position of the mm Wave access module.

2. The CPE of claim 1, wherein the rotating body comprises a rotating housing,
   the rotating housing defines a first accommodating space,
   the rotating housing is provided with an electrically non-conductive shielding area, and
   the mm Wave access module is disposed in the first accommodating space and within the electrically non-conductive shielding area.

3. The CPE of claim 2, wherein
   the control processing module is disposed in the first accommodating space or the base; or
   the Wi-Fi access module is disposed in the first accommodating space or the base; or
   the CPE further comprises a non-mm Wave mobile network access module, wherein the non-mmWave mobile network access module is connected to the control processing module and is disposed in the first accommodating space or the base; or
   the CPE further comprises a sound playing module, wherein the sound playing module is connected to the control processing module and is disposed in the first accommodating space or the base; or
   the CPE further comprises a microphone, wherein the microphone is connected to the control processing module and is disposed in the first accommodating space or the base.

4. The CPE of claim 1, further comprising a support body connected to the base, wherein the support body is provided with a torsion spring and a retaining ring;
   the rotating body is provided with a rotary shaft sleeve, wherein the rotary shaft sleeve passes through the support body, the torsion spring, and the retaining ring and is provided over the rotary shaft, and the torsion spring is connected to the rotary shaft sleeve and generates a pretension force on the rotary shaft sleeve; and
   the rotary shaft is a lead screw and is provided with a nut seat screwed on the rotary shaft, and the nut seat is connected to the rotary shaft sleeve.

5. The CPE of claim 4, wherein the support body comprises a first support housing and a second support housing disposed inside the first support housing, the torsion spring is disposed between the first support housing and the second support housing, and the retaining ring is disposed on an inner side wall of the second support housing.

6. The CPE of claim 5, wherein the second support housing defines a second accommodating space, and
   the second accommodating space is provided with at least one of the control processing module, the Wi-Fi access module, the non-mmWave mobile network access module, the sound playing module, or the microphone.

7. The CPE of claim 4, further comprising an angle sensor, which is connected to the control processing module and is disposed on one of the rotary shaft, the rotary shaft sleeve, or the rotating body.

8. The CPE of claim 1, further comprising a network port, which is connected to the control processing module and is provided in the base.

9. The CPE of claim 1, further comprising an electrically non-conductive shielding shell connected to the base, wherein the rotating body is disposed inside the electrically non-conductive shielding shell.

10. A control method for a customer premise equipment (CPE), the CPE comprising:
a Wi-Fi access module;
a rotating body; and
a base;
wherein the rotating body is provided with a millimeter wave (mmWave) access module, the base is provided with a rotary driving device and a rotary shaft, and the rotary driving device is connected to the rotating body via the rotary shaft; and
the control method comprising:
obtaining transmission quality information of a mmWave signal; and
controlling, according to the transmission quality information of the mm Wave signal, the rotary driving device to drive the rotating body to move, so as to adjust a position of the mmWave access module.

11. The control method of claim 10, wherein:
the CPE further comprises a support body connected to the base, wherein the support body is provided with a torsion spring and a retaining ring;
the rotating body is provided with a rotary shaft sleeve, wherein the rotary shaft sleeve passes through the support body, the torsion spring, and the retaining ring and is provided over the rotary shaft, and the torsion spring is connected to the rotary shaft sleeve and generates a pretension force on the rotary shaft sleeve;
the rotary shaft is a lead screw and is provided with a nut seat screwed on the rotary shaft, and the nut seat is connected to the rotary shaft sleeve; and
controlling, according to the transmission quality information of the mmWave signal, the rotary driving device to drive the rotating body to move, so as to adjust a position of the mmWave access module comprises:
controlling, according to the transmission quality information of the mm Wave signal, the rotary driving device to drive the rotating body to rotate and/or vertically move, so as to adjust the position of the mmWave access module.

12. The control method of claim 11, wherein controlling, according to the transmission quality information of the mm Wave signal, the rotary driving device to drive the rotating body to rotate and/or vertically move, so as to adjust the position of the mm Wave access module comprises:
in response to the transmission quality information of the mmWave signal not meeting a preset communication quality condition for a duration exceeding a first preset duration, controlling the rotary driving device to drive the rotating body to rotate and/or vertically move, so as to adjust the position of the mmWave access module until the transmission quality information of the mmWave signal meets the preset communication quality condition.

13. The control method of claim 12, wherein controlling the rotary driving device to drive the rotating body to rotate and/or vertically move comprises:
controlling the rotary driving device to drive the rotating body to rotate and/or vertically move by a preset motion magnitude.

14. The control method of claim 12, wherein controlling the rotary driving device to drive the rotating body to rotate and/or vertically move comprises:
controlling the rotary driving device to drive the rotating body to rotate by all possible rotation angles and/or vertically move by all possible distances;
obtaining an access signal strength corresponding to each of the possible rotation angles and/or obtaining an access signal strength corresponding to each of the possible distances, and obtaining an access signal point strength list according to the access signal strengths;
obtaining a target rotation angle and/or a target vertical moving distance according to the access signal point strength list; and
controlling the rotary driving device to drive the rotating body to rotate by the target rotation angle and/or to vertically move by the target vertical moving distance.

15. A non-transitory computer-readable storage medium storing computer-executable instructions, wherein the computer-executable instructions are configured for implementation of the control method of claim 10.

16. A non-transitory computer-readable storage medium storing computer-executable instructions, wherein the computer-executable instructions are configured for implementation of the control method of claim 11.

17. A non-transitory computer-readable storage medium storing computer-executable instructions, wherein the computer-executable instructions are configured for implementation of the control method of claim 12.

18. A non-transitory computer-readable storage medium storing computer-executable instructions, wherein the computer-executable instructions are configured for implementation of the control method of claim 13.

19. A non-transitory computer-readable storage medium storing computer-executable instructions, wherein the computer-executable instructions are configured for implementation of the control method of claim 14.

* * * * *